(12) United States Patent
Formaro et al.

(10) Patent No.: US 9,346,034 B2
(45) Date of Patent: May 24, 2016

(54) CATALYSTS FREE FROM NOBLE METALS SUITABLE FOR THE ELECTROCHEMICAL REDUCTION OF OXYGEN

(75) Inventors: Leonardo Formaro, Milan (IT); Mariangela Longhi, Lecco (IT); Pierluca Messina, Milan (IT); Ivano Galbiati, Milan (IT)

(73) Assignees: UNIVERSITA' DEGLI STUDI DI MILANO, Milan (IT); FONDAZIONE CASSA DI RESPARMIO DELLE PROVINCE LOMBARDE, Milan (IT)

(*) Notice: Subject to any disclaimer, the term of this patent is extended or adjusted under 35 U.S.C. 154(b) by 62 days.

(21) Appl. No.: 14/118,000

(22) PCT Filed: Jun. 28, 2012

(86) PCT No.: PCT/EP2012/062641
§ 371 (c)(1),
(2), (4) Date: Feb. 13, 2014

(87) PCT Pub. No.: WO2013/001040
PCT Pub. Date: Jan. 3, 2013

(65) Prior Publication Data
US 2014/0162869 A1    Jun. 12, 2014

(30) Foreign Application Priority Data
Jun. 30, 2011    (IT) .............................. MI2011A1206

(51) Int. Cl.
| | | |
|---|---|---|
| *B01J 21/00* | (2006.01) | |
| *B01J 23/00* | (2006.01) | |
| *B01J 25/00* | (2006.01) | |
| *B01J 29/00* | (2006.01) | |
| *B01J 31/00* | (2006.01) | |
| *B01J 21/18* | (2006.01) | |
| *B01J 27/20* | (2006.01) | |
| *H01M 4/90* | (2006.01) | |
| *H01M 8/10* | (2016.01) | |

(52) U.S. Cl.
CPC *B01J 21/18* (2013.01); *H01M 4/90* (2013.01); *H01M 2008/1095* (2013.01); *Y02E 60/50* (2013.01)

(58) Field of Classification Search
USPC .................................. 502/180, 100, 150, 174
See application file for complete search history.

(56) References Cited

U.S. PATENT DOCUMENTS

| | | | | |
|---|---|---|---|---|
| 2008/0113859 | A1* | 5/2008 | Popov | .................. B01J 37/0203 502/171 |
| 2010/0048380 | A1* | 2/2010 | Calabrese Barton | . H01M 4/881 502/5 |
| 2013/0211005 | A1* | 8/2013 | Ludvik | ..................... C08F 2/22 524/876 |

FOREIGN PATENT DOCUMENTS

| | | |
|---|---|---|
| WO | WO 03004156 A2 | 1/2003 |
| WO | WO 2008127828 A1 | 10/2008 |

OTHER PUBLICATIONS

PCT International Search Report for PCT/US2012/062641.
(Continued)

*Primary Examiner* — James McDonough
(74) *Attorney, Agent, or Firm* — Lucas & Mercanti, LLP.

(57) ABSTRACT

The invention concerns new catalysts for the reduction of oxygen suitable for PEM fuel cells, the process for their preparation and their use in other electrolytic processes.

35 Claims, 4 Drawing Sheets

(56) References Cited

OTHER PUBLICATIONS

Maruyama J. et al: "Application of Nitrogen-Rich Amino Acids to Active Site Generation in Oxygen Reduction Catalyst" Journal of Power Sources vol. 182 No. 2 pp. 489-495, Aug. 2008.

Subramanian N P et al: "Nitrogen-Modified Carbon-Based Catalysts for Oxygen Reduction Reaction in Polymer Electrolyte Membrane Fuel Cells." Journal of Power Sources vol. 188 No.

I. Galbiati et al. "Iron and Copper Containing Oxygen Reduction Catalysts from Templated Glucose-Histidine" Fuel Cells vol. 10 No. 2 pp. 251-258, Apr. 1, 2010.

Jun Maruyama et al: "Fuel Cell Cathode Catalyst with Heme-Like Structure Formed from Nitrogen of Glycine and Iron" Journal of the Electrochemical Society vol. 154 No. 3 pp. B29.

Jun Maruyama et al: "Structure Control of a Carbon-Based Noble-Metal-Free Fuel Cell Cathode Catalyst Leading to High Power Output" Chemical Communications No. 27 p. 2879, 2007.

\* cited by examiner

CATALYSTS FREE FROM NOBLE METALS SUITABLE FOR THE ELECTROCHEMICAL REDUCTION OF OXYGEN

CROSS-REFERENCE TO RELATED APPLICATIONS

This application is a 371 of PCT/EP2012/062641 filed on Jun. 28, 2012, which claims the priority of Italian Patent Application Serial No. MI2011A001206 filed on Jun. 30, 2011, the contents of each of which are incorporated herein by reference.

The object of the present invention is a catalyse for the reduction of oxygen in PEM (Proton Exchange Membrane) and in other electrolytic processes, as well as a process for preparation thereof.

The oxygen reduction is a key element for the commercial success of important electrochemical devices such as acid type fuel cells, including Proton Exchange Membrane Fuel Cells (PEMFC).

Hydrogen/oxygen (air) fuelled PEMFC (Polymer Electrolyte Fuel Cells) are deemed to be potential substitutes of the internal combustion engines of motor vehicles. Compared with these, they have the advantage of an improved energy conversion of the fuel and of avoiding the emission of greenhouse gases ($CO_2$, $NO_x$). However, their wide-scale commercial diffusion is hindered by the cost of the polymeric membranes necessary to realize them and also by the cost and availability of the catalytic materials used.

Fuel cell catalysts are essential to speed up the reaction rate of both hydrogen oxidation (anode) and oxygen reduction (cathode), with the supply of correspondingly high current. Supported platinum catalysts are used in all PEMFC currently under development and testing. In 2008, according to an estimate of the Department of Energy USA (DOE), the amount of platinum necessary in a PEMFC stack with a standard power (86.3 kW) is 30.3 g (1.07 troy oz), with a total cost of ~1,100 $/stack, taking as the reference cost for platinum its mean value in a 5-year estimate (1,100 $/oz). This represents around 54% of the estimated cost of each stack. According to an assessment of the unitary cost reduction afforded by factors of scale, the total amount of platinum necessary to produce 500,000 stacks/year is 535,000 oz/y (16.6 tons/year). Even reducing such estimates, the amount of platinum necessary worldwide would be extremely high even without taking into consideration other uses of the metal for other existing types of consumption.

The poor availability of platinum in nature could result in a far-reaching destabilisation of its world market.

The data refer to total Pt used at the two PEMFC electrodes (a=anode and c=cathode); in fact, the relative distribution between the electrodes is approx. 1:10 (a:c) due to the different kinetic behaviour of the oxygen reduction reaction, that is much slower than the hydrogen oxidation reaction. Therefore, at present, improvements are directed towards the functioning of the cathodes. Some solutions have attempted to farther reduce the amount of platinum used, for instance: optimising the size of the metal nanoparticles also taking into account variations in the reaction rate, which has a maximum for Pt particles of ~2-3 nm; the use of carbon-supported monolayers with atomic thickness; the development of binary (Pt—Co, Pt—Fe) and ternary (Pt—Co—Mn) alloys and of intermetallic compounds (Pt—Pb).

One of the most promising lines of research addresses the development of catalysts without noble metals. Most of this research is directed towards the use of substances containing nitrogen and in particular, macrocycles such as phthalocyanines, porphyrins, azulenes with a Co, Fe or Ni metal-centre. To prevent demolition of the macrocycles during the thermal treatments, these have also been chemically anchored or intercalated in the carbon ("ball milling"). In a number of recent studies, some of the materials obtained using porphyrins have demonstrated good oxygen reduction characteristics, although lower than those calculated for a "target" (Pt-free) catalyst, not yet available and modelled using the data of a platinum-based commercial catalyst.

As for the costs of the above materials, in view of the current cost of porphyrin and the complexity of the multi-step preparations involved, large-scale replacement of platinum with these materials is considered unlikely. In fact, even without considering the losses in weight due to thermal treatments, the estimated, cost per unit of mass of a porphyrin reactant is around 5-6 times that of platinum.

Another interesting application of the catalysts for the oxygen reduction reaction is in the chlor-alkali electrolysis process which is an essential component of major petro-chemical production lines. Chlorine is a precursor in the production of vinylchloride, which is in turn used to obtain polyvinylchloride. Chlorine is also used to produce isocyanates from which various types of building materials are obtained. In industry, the electrolysis processes used nowadays produce chlorine, hydrogen and caustic soda, however, with high energy consumption. Therefore, the possibility of reducing the energy requirement of this process is extremely interesting and can be achieved by replacing the current cathodes for hydrogen evolution with cathodes for oxygen reduction. This process, known as depolarized chlor-alkali electrolysis, allows a reduction in energy consumption from the current 2400 kWh/ton of chlorine to 1,600 kWh/ton.

SUMMARY OF THE INVENTION

The present invention provides a catalyst with properties, in terms of efficiency, comparable to those of the platinum-based catalysts, characterised by high level oxygen reduction potential, and which makes it possible to obtain a nigh current density in the typically high acidic conditions of PEMFC and the typically high alkalinity of the caustic soda solutions, that is characteristic of depolarised chlor-alkali electrolysis.

Object of the Invention

According to a first object, the invention describes a process for the preparation of a catalyst free from noble metals (i.e. gold, platinum) for the oxygen reduction as well as the catalyst thus obtained.

In accordance with a further object, the invention concerns the application of such catalyst in PEM fuel cells for the production of electric current.

Also, the use of the catalyst of the invention in cells for depolarised chlor-alkali electrolysis for the production of soda is herewith disclosed.

Electro-chemical processes in which cells comprising the catalyst of the invention are used and she cells themselves are also contemplated.

DETAILED DESCRIPTION OF THE INVENTION

Figure 1:
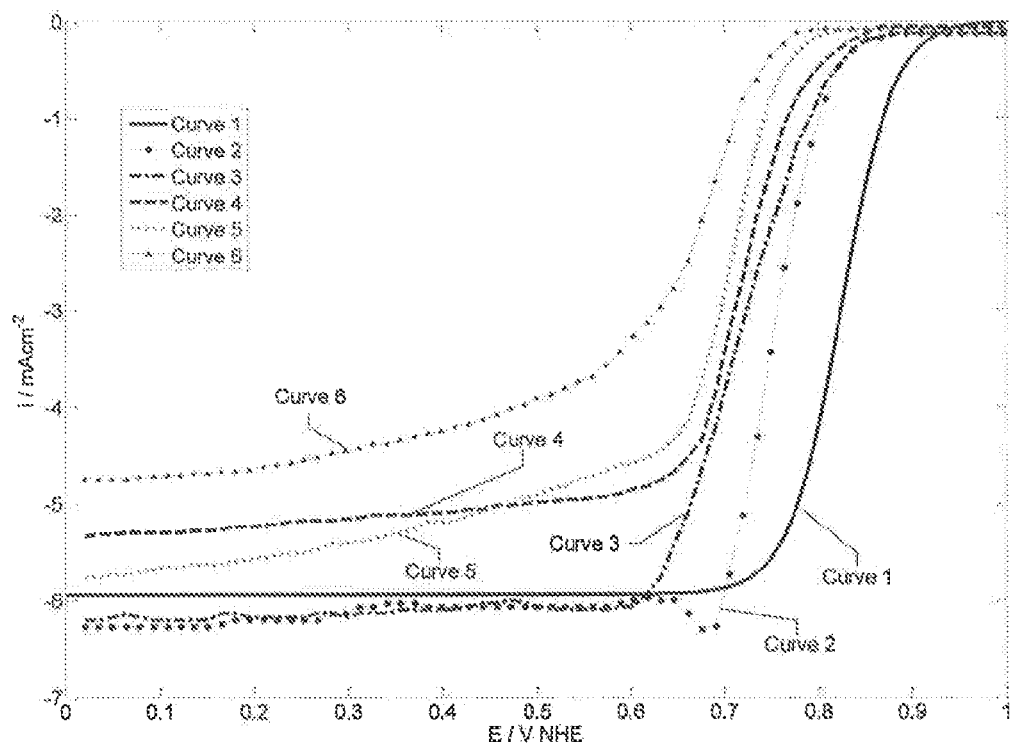
FIG. 1 shows the results of the oxygen reduction tests in acid environment obtained with the materials known in the art.

According to a first object, the invention describes a process for the preparation of a catalyst free from noble Said process, in particular, comprising the steps of:
a) preparing a composition comprising a sugar, a nitrogen base and salt or a mixture of salts;
b) performing carbonization of the composition thus obtained;
c) pyrolysing the material obtained from step c); characterised in that said nitrogen base is selected among the precursors containing the guanidine functional group

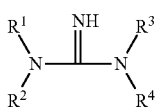

wherein $R^1$, $R^2$, $R^3$, $R^4$ are substituents.

According to the present invention, in phase a), said sugar is represented in particular by a monosaccharide, selected preferably from among glucose, xylose and fructose; or mixtures thereof.

In particular, step a) comprises a step a1) wherein the sugar is mixed with the nitrogen base.

In a preferred embodiment, the sugar is in the form of a solution and even more preferably as a concentrated solution (i.e. a concentration generally of >1.5 M).

In the case of glucose, for example, a saturated solution (around 1.68 M) is preferably used.

As above said, within the purposes of the present invention, the nitrogen base is a precursor containing the guanidine functional group

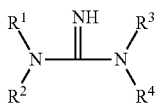

wherein $R^1$, $R^2$, $R^3$, $R^4$ are substituents.

In particular, preferred nitrogen bases are: guanidine, guanylurea, 2-guanidobenzimidazole and dicyandiamide.

It is intended that "nitrogen base" does refer to a nitrogen base as such as well as to a nitrogen base salt; for instance, the above mentioned nitrogen bases can be in the form of an acetate salt.

According to a preferred embodiment, in step a1) the sugar and the nitrogen base are mixed together in proportions of between 0.5:1 and 5:1 and preferably between 1:1 and 1:1.5 (mol/mol).

Step a) comprises after step a1) a step a2), wherein a metal salt is added.

In particular, said metal salt is a salt of a non-noble metal and it is represented preferably by an iron salt.

Preferably, the iron salt is an iron (II) salt; however, an iron (III) salt can be used as well.

In case of a mixture of salts, the above iron salts can be mixed with a cobalt (II) salt.

In a particularly preferred embodiment, the iron or she iron and cobalt salts are acetate salts.

The process of she present invention step a) further comprises step a3), wherein silica is added to she mixture comprising the base, the nitrogen base and the salt(s).

In particular, according to a preferred embodiment, where the sugar is in the form of a solution, step a3) is performed by soaking a matrix of silica into the solution comprising the sugar base, the nitrogen base and the metal, salt or salts.

In addition to that, it is preferred that the solution prepared from step a1) is acidified with the addition of an acid.

For said purpose, a carboxylic acid such as the oxalic acid or the acetic acid are preferably used.

In a preferred embodiment, glacial acetic acid is used.

In particular, the acid is added in an equimolar quantity to the salifiable groups of the nitrogen base.

To facilitate the formation of a solution, in phase a1), the mixture is treated in a cooled ultrasonic device and with a vortex stirrer.

In phase a2), a quantity of between 0.1-3.5% and, preferably between 0.3-3% (weight of the cation/weight of the reactants excluding the acid and silica) of an Fe (II) salt, preferably Fe (II) acetate, is added to the solution obtained from phase a) or a1).

Alternatively to the sole Fe (II) acetate, a mixture of Fe (II) acetate and of cobalt (II) acetate can be used in a ratio of between approx. 1:1 to approx. 2:1. For instance, a mixture of 1% Fe (II) acetate and 1% Cobalt (II) acetate or a mixture of 2% Fe (II) acetate and 1% Cobalt (II) acetate can be used.

It is preferred than ouch salts be added only after the sugar and nitrogen base have completely dissolved.

According to the above mentioned preferred embodiment, in phase a3), a quantity of high specific surface area silica, with a specific surface area for example of ~350 m$^2$/g, is impregnated with the solution thus obtained.

Preferably, a quantity of silica in a ratio to the volume of the solution of approx. 0.4-0.5 (g/cm$^3$) is used.

For the purposed of the present invention, the step b) of carbonisation is performed placing the material obtained from step a) in an oven, preheated to approx, 600° C.

Heating is continued for a period, of between 50-120 minutes at about 550-650° C. and preferably at 600° C. for one hour.

In particular, the heating phase is carried out in an inert gas atmosphere (N$_2$) with a flow rate ~100 cm$^3$/min.

After phase b), following cooling in air, the product can be leached in an optional phase b1) by treatment with sodium hydroxide in order to remove residual silica.

Preferably, the solution of NaOH is a solution of approx. 1-3 M and boiling under reflux is carried out for a period of approx. one or two hours, preferably one hour and a half.

After phase b1) and before phase c), a phase b2) may be inserted in which the product is washed with ultra-pure water so remove residual salts. Subsequently, the product is dried, for instance, at a temperature of 100° C. for one day in a nitrogen atmosphere.

In the pyrolysis phase (phase c), the product is heated to higher temperatures than in the carbonisation phase using quartz reactors. The product is placed in an oven at a temperature of between approx. 650° C. and 1000° C., preferably between 700° C. and 975° C., in a stream of nitrogen (~100 cm$^3$/min) for approx. 2.5-3.5 hours, preferably 3 hours. For such purpose, the oven is preferably heated at a rate of approx. 6° C./min.

Figure 4:
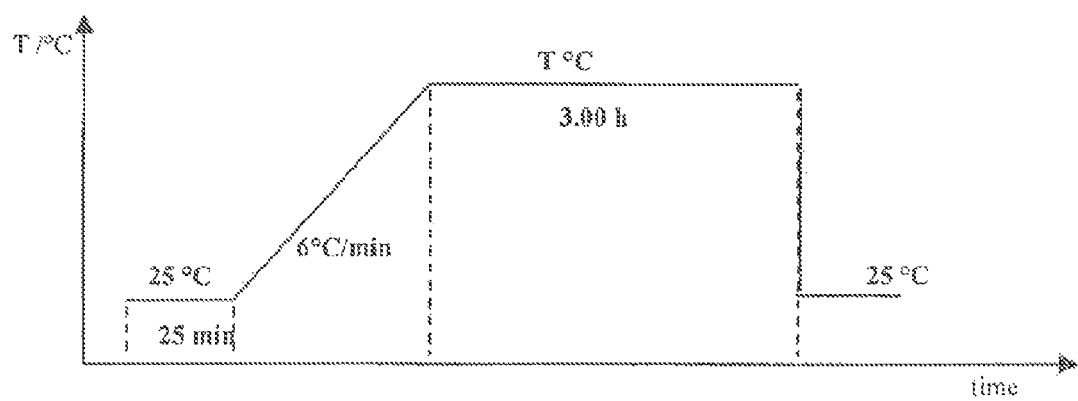
FIG. 4 shows the thermal profile of a pyrolysis phase.

An example of the heating ramp is shown in FIG. 4.

The matrix thus obtained is then cooled quickly to room temperature.

The catalyst thus prepared is therefore ready for being used in the construction of electrodes for electrolytic cells.

As described above, such materials allow high reaction rate, with the supply of a correspondingly high current, of the oxygen reduction at the cathode in hydrogen/oxygen (air) Polymer Electrolyte Membrane Fuel Cells (PEMFC).

Similarly, the catalytic materials described can be used in the production of cells for the electrolysis with oxygen depolarised cathodes (ODC).

Such cells may be used advantageously in depolarized chlor-alkali electrolysis processes for the industrial preparation of soda (NaOH).

Example 1

Preparation of the Solutions with which to Impregnate the Silica

The following solutions were prepared according to the process described above, using:

Solution a):

| glucose | 3.017 g | (1.68M) |
|---|---|---|
| acetic acid | 3.006 g | (5M) |
| guanidine acetate | 2.007 g | (1.68M) |
| iron acetate | 0.051 g | (0.3%*) |
| cobalt acetate | 0.054 g | (0.3%*) |

Solution b):

| glucose | 3.021 g | (1.68M) |
|---|---|---|
| acetic acid | — | — |
| guanidine acetate | 2.797 g | (2.35M) |
| iron acetate | 0.118 g | (0.6%*) |

*weight of the cation/weight of the reactants excluding the acid and silica

Example 2

Preparation of the Silica Gel and of the Catalyst

One of the solutions a) or b) of Example 1 was added to the silica according to the instructions of the manufacturer (Silica gel 60 HR extra pure, for thin film chromatography, Merck art. 7744).

In particular, 10 ml of the solution were added, to approx. 4.3 g of silica; the suspension was then homogenised for 5 minutes. After leaving it resting for a few minutes, it was stirred again for a further 5 minutes. The gel was then transferred quantitatively into a cylindrical quartz reactor; after degassing for approx. 10 minutes in nitrogen stream (100 cm$^3$/min), the reactor was inserted in a vertical tubular oven preheated to 600° C. for one hour, maintaining the nitrogen stream. The reactor was then cooled in air still with nitrogen stream.

The black carbon powders obtained, were leached with NaOH under reflux conditions to eliminate the silica. The powders were suspended in 250 ml of NaOH (3 M) and boiled under reflux conditions for approx. one hour and a half. After cooling, the carbons were filtered (Durapore 0.45 μm filters, Millipore). The solids were suspended in water (~250 ml), filtered, re-suspended in water until conductivity of the filtered solution reached values of less than 4 μS.

The carbons were then cried at 100° C. under stream of nitrogen (for approx. 24 hours) and ground in a ball mill (10 Hz, 5 min) with agate bowl and grinding balls.

Known quantities of the carbons of the first stage were pyrolysed at a temperature always above T=600° C., using quartz reactors under stream of $N_2$. Temperature was modified according to the following profile:

initial degassing ($N_2$, 100 cm$^3$/min, 25 minutes at 25° C.)
ramp up to temperature desired at a rate of 6° C./min ($N_2$, 100 cm$^3$/min).
3 hours at the desired temperature ($N_2$, 100 cm$^3$/min)
air cooling ($N_2$, 100 cm$^3$/min).

Lastly, the sample was reground in a ball mill (10 Hz, 5 min).

Example 3

Assessment of the Properties of the Catalysts of the Invention in an Acid Environment To assess the properties of the materials of the invention, I/E (current/potential) curves were performed using cyclic voltammetry and rotating disk electrodes.

In particular, the rotating disk electrode was prepared using she catalysts produced according to Examples 1 and 3 in order to assess their efficiency.

FIG. 1 shows the curves obtained in acid conditions using catalysts known in the art.

In particular:
curve 1: represents the "target" for platinum-free materials (i.e. it represents a minimum target for replacement of Pt/C with platinum-free catalysts) and was calculated considering a catalytic activity equal to $\frac{1}{10}$ of that of commercial catalysts with a platinum content of 46% supported on carbon (Pt/C). The initial oxygen reduction potential is E~0.92 V/NHE and the limiting current, perfectly independent of potential, is ~6 mA/cm$^2$.

Curve 2: UK63. Main reactant: iron(III) chloride 5,10,15, 20-Tetrakis(4-Methoxyphenyl)porphyrin (FeClTMPP); 4 heat treatments (T-450 ($N_2$), 800 ($N_2$), 800 ($N_2$—$H_2$), 800 ($N_2$—$CO_2$)° C.); the $2^{nd}$-$4^{th}$ heat treatments followed by washing;

Curve 3: FC280. Main reactant: Fe(II) acetate on carbon black; pyrolysis at T=950° C. in $NH_3$;

Curve 4: M786. Main reactant: Perylenetetracarboxylic dianhydride, Fe(II)acetate on carbon black; pyrolysis at T=1050° C. in $NH_3$.

Curve 5: DAL900C. Main reactant: pyrrole, Fe(Cl)$_3$, impregnation on silica, polymerization, multi-step pyrolysis, last stage at T=900° C. in $NH_3$;

Curve 6: GAdFeCu. Main reactant: glucose, adenine, Fe(II) and Cu(III) gluconate; de-hydration at 150° C., pyrolysis at T-1000° C. (Ar).

Figure 2:
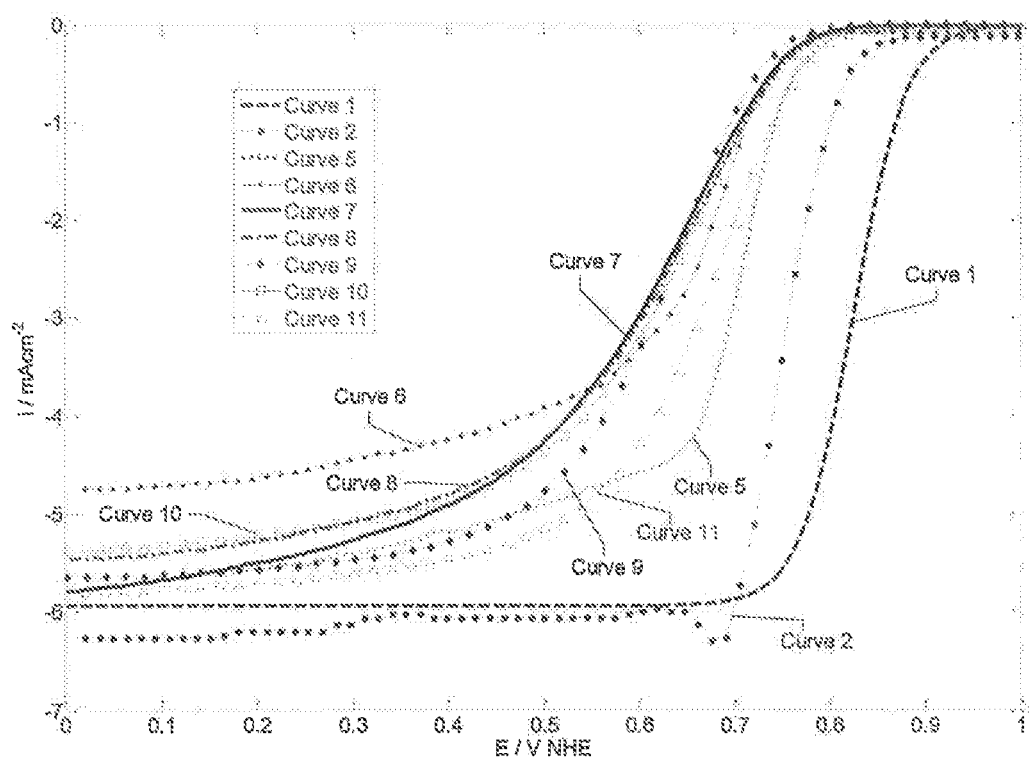
FIGS. 2 and 3 snow the results of the oxygen reduction tests obtained with the materials of the invention in an acid and alkaline environment respectively.

In FIG. 2, together with the curves obtained using already known materials, the curves obtained, on catalysts prepared according to the invention are shown;

Curve: glucose-guanidine acetate (molar ratio 1:1)-Fe (II) 0.5% weight,
Curve 8: glucose-guanidine acetate (molar ratio 1:1)-Fe(II) 0.3% weight,
Curve 9: glucose-guanidine acetate (molar ratio 1:1.4)-Fe (II) 0.3% weight,
Curve 10: xylose-dicyandiamide (molar ratio 1:2)-Fe (II) 0.3% weight
Curve 11: glucose-guanidine acetate (molar ratio 1:1)Fe (II) 1% weight (dry procedure, see Example 6)

Also for the preparation of these materials (curves 7-10) Iron (II) has been added as acetate and the percentages in weight refer to the weight of the Fe (II) cation in relation so the initial weight of the reactants excluding the acid and silica.

As regards preparation conditions, the materials used to obtain curves 2-5 are generally expensive materials or which can be prepared through multi-step synthesis or in difficult conditions (ammonia atmosphere, temperatures of up to 900° C.), that make their application at industrial level extremely costly.

For instance, it is worth noting that the preparation of the Fe(III) chloride 5,10,15,20-Tetrakis(4-Methoxyphenyl)porphyrin (FeClTMPP) material (Curve 2) requires 4 thermal treatments, respectively at 450° C., 800° C. both in nitrogen, at 800° C. in nitrogen and at 800° C. in $CO_2$; also, the main reactant (FeClTMPP) costs some hundred euros per gram.

Example 4

Figure 3:
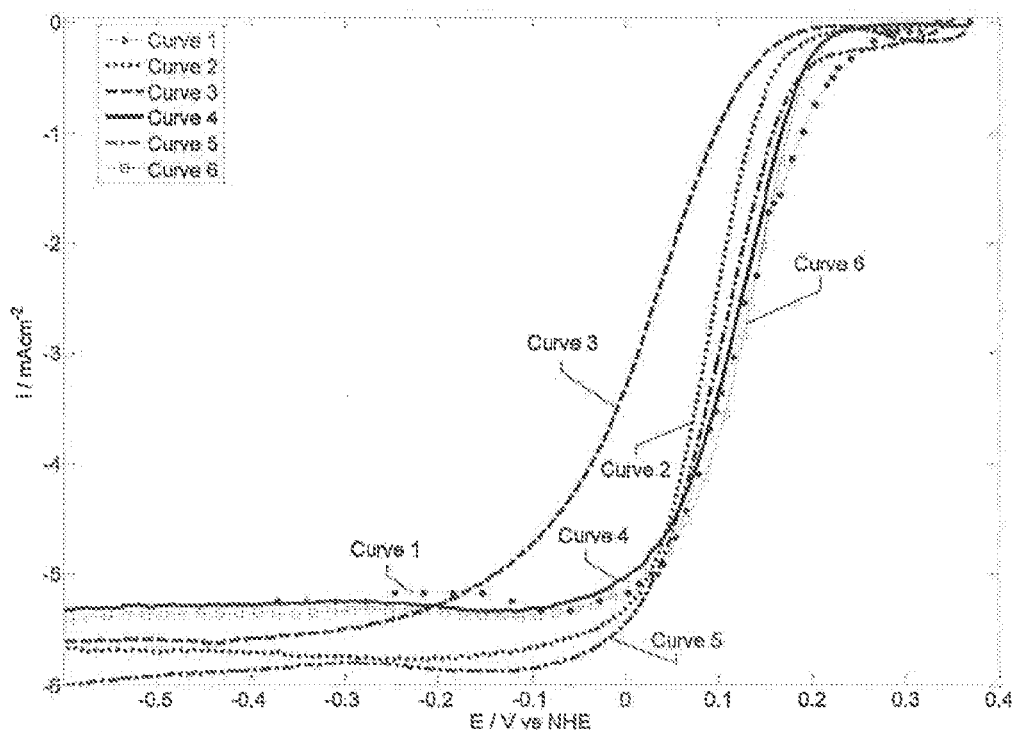

Assessment of the Properties of the Catalysts of the Invention in an Alkaline Environment FIG. 3 shows the curves obtained from application of catalysts known in the art and of catalysts according to the invention in an alkaline environment (0.1 M KOH at 25° C.).

In particular:
curves 1 and 2 show the behaviour of platinum (EC20, Pt 20%, independent tests: curve 1 data taken from literature, curve 2 data obtained in other tests by the present inventors and considered reference results).
curve 3 shows the behaviour of silver (Aldrich, particle dimension <100 nm);
curves 4 and 5 show the behaviour of the catalysts obtained according to the invention, i.e.:
curve 4 Glucose-guanidine acetate (1:1), Fe (II) 1%*
curve 5 Glucose-guanidine acetate (1:1), Fe (II) 0.6%*
curve 6 Glucose-guardine acetate (1:1), Fe (II) 1%*(dry procedure, see Example 6)
*(weight of the cation/weight of the reactants excluding the acid and silica)

The results reported in FIG. 3 show that the performance of the catalysts of the invention is much higher than that of catalysts containing silver and is compatible with that of materials comprising platinum.

Example 5

Characteristics of the Catalyst of the Invention a) A sample of the catalyst produced according to Example 2 has been analysed and the specific surface area resulted to have a mean value of 565±34 $m^2/g$ (the result has been reproduced on 9 different measurements).

The specific surface area of a sample produced according to Example 2, but wherein silica was not comprised, in the catalyst was ~200 $m^2/g$. The sample proved to be useless from a catalytical point of view.

b) The pore dimension of the catalyst of the invention is about 3-4 nm (within the so-called "mesoporosity") measured with the BJH method. It was found that about 10% of the total, area is characterised by smaller pore diameter.

Example 6

Dry Procedure

The process disclosed in the above Example 1 has bees repeated, but without the use of the acetic acid, according to the below Table.

| Dry methodology | | Example 1 | |
|---|---|---|---|
| glucose | 3.026 g | Glucose | 3.017 g |
| guanidine acetate | 2.008 g | guanidine acetate | 2.007 g |
| iron acetate | 0.167 g (1 wt %) | iron acetate | 0.051 g (0.3 wt %) |
| | | acetic acid | 3.006 g |
| silica | 4.3 g | Silica | 4.3 g |
| Total volume | — | Total volume of the aqueous solution | 10 ml |

In the present Example all the substances have been dry mixed together. The mixture has been milled in a agate ball-mill for 15 minutes at 10 Hz. The mixture has been inserted into a vertical oven pre-heated at T=600° C. for 1 h under nitrogen (flux 100 cm3/min) using the same conditions as in the Example 1). The obtained carbon has been reflux-leached with NaOH 3M, dried and pirolyzed at 900° C. like the sample in Example 1.

The catalyst obtained according to Example 6 (with the so-called "dry procedure"; showed the same electrochemical properties of the catalyst obtained according to Example 1.

From the above description of the catalysts of the invention, the numerous advantages brought by their use in PEM fuel cells will be immediately clear to the person expert in the sector.

In fact, the electrochemical behaviour of the materials developed is comparable to that of platinum-free catalysts not based on porphyrins or phthalocyanines. In addition, the materials concerned have a high specific surface (~500-1800 $m^2/g$) and open pores with a dimensional distribution centered in the lower mesoporosity zone (2-50 nm).

On the other hand, also from an economic point of view, they offer the undeniable advantage of a considerable reduction in the costs of preparation in that the reactants used (the saccharides such as glucose and xylose) are widely available at low cost.

As regards the application of the materials of the invention in an alkaline environment, for example for the production of soda through electrolysis in the so-called oxygen depolarized, cathode cells (ODC), they would render it possible to obtain similar performance levels to those of platinum and higher than those of the electrodes currently used, which contain silver.

Thereof, it is widely justified the interest in these materials on the industrial scale.

From the above description of the reactants and of she procedure for preparation of the catalysts according to the invention, the expert person, in order to meet specific contingent requirements, may make several modifications, additions or replacements of elements with others of functionally equivalent type, all within the scope of the present claims, without overstepping the scope of the attached claims. Each of the characteristics described as belonging to a possible form of embodiment can be obtained independently from other forms of embodiment described.

The invention claimed is:

1. A process for preparing a catalyst for the electrochemical reduction of oxygen, comprising the steps of:
   a) preparing a composition comprising a sugar, a nitrogen base and salt or a mixture of salts;
   b) performing carbonization of the composition thus obtained;
   c) pyrolysing the material obtained from step b);
wherein said nitrogen base is selected among the precursors containing the guanidine functional group

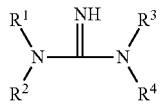

wherein R¹, R², R³, R⁴ are substituents.

2. The process according to claim 1, wherein said step a) comprises the step a1) for the preparation of a mixture of the sugar with the nitrogen base.

3. The process according to claim 1, wherein step a) further includes step a2) wherein the salt or the mixture of salts is added to the mixture of the sugar and the nitrogen base.

4. The process according to claim 1, wherein step a) further includes step a3) wherein silica is added to the mixture obtained from step a2).

5. The process according to claim 1, wherein in step a1) the sugar is in the form of a solution.

6. The process according to claim 5, wherein step a3) is performed by soaking a silica matrix into the solution comprising the sugar, the nitrogen base and the metal salt or mixture of salts.

7. The process according to claim 1, wherein said sugar in step a) is selected from among glucose, xylose and fructose; or mixtures thereof.

8. The process according to claim 1, wherein said nitrogen base in step a) is selected from among guanidine, guanylurea, 2-guanidobenzimidazole and dicyandiamide.

9. The process according to claim 1, wherein said sugar and said nitrogen base are mixed in a ratio ranging from 0.5:1 to 5:1 and preferably comprised from 1:1 to 1:1.5 (mol/mol).

10. The process according to claim 5, wherein said solution is a highly concentrated solution, preferably >1.5 M.

11. The process according to claim 2, wherein said solution of the sugar and of the base is acidified.

12. The process according to claim 11, wherein said acidification is carried out by adding acetic acid.

13. The process according to claim 12, wherein said acidification is obtained by adding an amount of acid required to completely salify the nitrogen base.

14. The process according to claim 1, wherein said salt is an iron salt.

15. The process according to claim 14, wherein said iron salt is an iron (II) salt.

16. The process according to claim 1, wherein said mixture of salts comprises an iron salt and a cobalt salt.

17. The process according to claim 16, wherein said cobalt salt is a cobalt (II) salt.

18. The process according to claim 16, wherein said iron and said cobalt salt are acetate salts.

19. The process according to claim 16, wherein said iron salt is an iron (III) salt.

20. A process for preparing a catalyst for the electrochemical reduction of oxygen, comprising the steps of:
a) preparing a composition comprising a sugar, a nitrogen base and salt or a mixture of salts;
b) performing carbonization of the composition thus obtained;
c) pyrolysing the material obtained from step b);
wherein said nitrogen base is selected among the precursors containing the guanidine functional group

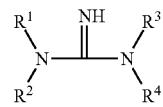

wherein R¹, R², R³, R⁴ are substituents,
wherein:
step a) further includes step a2) wherein the salt or the mixture of salts is added to the mixture of the sugar and the nitrogen base,
in step a2) an amount comprised from 0.1 to 3.5%, preferably comprised from 0.3 to 3% (weight of cations/weight of reactants, except for acid and silica) of iron (II) acetate or of a mixture of iron (II) acetate and cobalt acetate (II) is added.

21. The process according to claim 1, wherein in said mixture the iron (II) acetate and the cobalt acetate (II) are comprised in a ratio of from about 1:1 to about 2:1.

22. Process according to claim 1, wherein in step b) of carbonising, the material is subjected to heating at a temperature of about 550-650° C. for about 50-120 minutes.

23. Process according to claim 22, wherein the material is subjected to heating at a temperature of 600° C. for about 60 minutes.

24. Process according to claim 1, wherein step c) of pyrolyzing is carried out at a temperature of about 650-1000° C. for about 2.5-3.5 hours.

25. Process according to claim 24, wherein pyrolysis is carried out at a temperature of about 700-975° C.

26. Process according to claim 19, wherein pyrolysis is carried out in a heated furnace at a rate of about 6° C./min.

27. Process according to claim 1, wherein after step b) and before step c), a step b1), in which the product obtained from step b) is treated with boiling NaOH, is included.

28. Process according to claim 27, wherein in said step b1) the concentration of NaOH ranges from about 1 to 3 M.

29. A process for preparing a catalyst for the electrochemical reduction of oxygen, comprising the steps of:
a) preparing a composition comprising a sugar, a nitrogen base and salt or a mixture of salts;
b) performing carbonization of the composition thus obtained;
c) pyrolysing the material obtained from step b);
wherein said nitrogen base is selected among the precursors containing the guanidine functional group

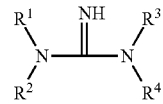

wherein R¹, R², R³, R⁴ are substituents,
wherein:
in step b) of carbonising, the material is subjected to heating at a temperature of about 550-650° C. for about 50-120 minutes,
after said step b1) and before step c) it is possible to include a step b2), in which the product is washed with water and subsequently dried.

30. Process according to claim 1, comprising the steps of:
mixing a sugar, a nitrogen base or the salt of a nitrogen base, an iron salt and silica obtaining a composition;
carbonizing the thus obtained composition at 600° C. obtaining a material;

treating said material with NaOH;
pyrolysing the thus obtained material at 900° C.

31. A catalyst obtained according to the process of claim 1.

32. A catalyst according to claim 30, comprising a specific surface area of about ~500-1800 m²/g.

33. Product according to claim 30, having a pore dimensions of about 3-4 nm.

34. Product according to claim 33, having at least 10% of the total area with pores having a diameter <3-4 nm.

35. Electrolytic cell comprising the catalyst obtained according to the process of claim 1.

* * * * *